United States Patent [19]

Ishino

[11] Patent Number: 5,783,128
[45] Date of Patent: Jul. 21, 1998

[54] PRODUCTION OF COMPOSITE INSULATORS

[75] Inventor: Shigeo Ishino, Niwa-gun, Japan

[73] Assignee: NGK Insulators, Ltd., Japan

[21] Appl. No.: 615,999

[22] Filed: Mar. 18, 1996

[30] Foreign Application Priority Data

Mar. 30, 1995 [JP] Japan ................................. 7-073082
Mar. 4, 1996 [JP] Japan ................................. 8-045840

[51] Int. Cl.$^6$ .......................... B29C 45/16; B29C 45/36; B22B 7/12
[52] U.S. Cl. .......................... 264/135; 264/265; 425/111
[58] Field of Search .......................... 264/229, 230, 264/259, 265, 135; 425/111

[56] References Cited

U.S. PATENT DOCUMENTS

4,057,687 11/1977 Willem ................................. 174/179
4,702,873 10/1987 Kaczerginski ................................. 264/135

*Primary Examiner*—Jan H. Silbaugh
*Assistant Examiner*—Suzanne E. Mason
*Attorney, Agent, or Firm*—Parkhurst & Wendel, L.L.P.

[57] ABSTRACT

A composite insulator-producing process including the steps of forming the housing from the housing-forming insulating polymer material and then vulcanized around the outer periphery of the rod-shaped core member by using the mold in the state that the core member is mechanically or thermally expanded by substantially ($\delta-\alpha$) or more in which $\delta$ is an axially linear expanded length by which the core member would be thermally expanded if the core member is heated to a molding temperature for the housing, and $\alpha$ is an axially linear expanded length by which the mold would be thermally expanded if the mold is heated to a molding temperature.

17 Claims, 4 Drawing Sheets

PRODUCTION OF COMPOSITE INSULATORS

BACKGROUND OF THE INVENTION

(1) Field of the Invention

The present invention relates to a process for the production of a composition insulator which includes a core member and a housing formed around the outer periphery of the core member, suppresses the occurrence of a defect between the core member to and the housing to the utmost, and possesses excellent insulating characteristic. The term "composite insulator" used in the specification and claims of this application includes both "hollow composite insulator" and "solid composite insulator". The composite insulator means a device including a solid or hollow core member made of FRP or the like, and a housing formed around the outer periphery of the core member and made of an insulating polymer material such as EPDM, silicone rubber, ethylene-propylene rubber, ethylene-propylene-diene rubber.

(2) Related Art Statement

Similarly to the porcelain insulator, the composite insulator is required to have a high insulating property. Since the composite insulator has the structure in which the housing made of the insulting polymer material such as EPDM is provided around the outer periphery of the core member made of FRP or the like, a gap may be formed at an interface between the core member and the housing due to insufficient adhesion. The formation of such a gap causes an electric defect upon the insulator due to insufficient insulating property at the interface between the core member and the housing. Therefore, in order to prevent the electric defect due to the above gap, the core member and the housing are now bonded to each other via an adhesive or a primer applied to the interface between the core member and the housing during the molding.

However, the present inventor has discovered that even if the core member and the housing are bonded to each other via the adhesive or primer applied to the interface between the core member and the housing during the molding according to the above conventional manner, adhesion between the core member and the insulating polymer material of the housing cannot be satisfactorily ensured, and accordingly the electric defect due to the gap cannot be sufficiently prevented. The present inventor has examined this problem, investigated causes thereof, and finally accomplished the present invention. In the following, details of how to have finally accomplished the present invention will be explained.

Having strenuously investigated the above-mentioned problem, the inventor discovered that if the housing is formed around the core member in the state that either end of the core member is not particularly restricted, the housing is formed from the polymer material inside a specific mold, but good adhesion could not be realized between the core member and the insulating polymer material bonded to each other via the primer or adhesive particularly at the opposite ends of the housing due to compression shearing forces acting at the opposite ends of the housing, because the opposite ends of the core member can be freely thermally expanded in its axial directions. He also discovered that if the housing is formed around the core member in the state that the opposite ends of the core member are restricted, the polymer material is molded inside the specific mold, and the core member is prevented from being thermally expanded in the axial directions at the opposite ends thereof so that the core member is deformed and consequently good adhesion cannot necessarily be realized between the core member and the insulating polymer material.

Further, since adhesion between the core member made of FRP or the like and the insulating polymer material such as EPDM is not satisfactory, as mentioned above, the primer or the adhesive is applied to the outer periphery of the core member to tightly adhere the core member and the insulating polymer material together. Thus, the core member is tightly bonded to the insulating polymer material via the primer or the adhesive. In this case, although the insulating polymer material is molded and vulcanized around the outer periphery of the core member to which the primer or the adhesive is preliminarily applied, some primers or adhesives currently used for this purpose may cause deterioration in bonding if they are preliminarily heated to a final molding temperature. Therefore, if such a primer or adhesive is used, the temperature is set, in a initial molding stage, at such a level to cause no deterioration in the activity of the primer or adhesive, and thereafter the insulating polymer material is set at a final molding temperature after the molding of the insulating polymer material is started. Thus, the molding time can be shortened from the standpoint of the practical application. However, the present inventor has acquired the recognition that the above-mentioned problem would be resolved by positively preheating the core member before the molding, which had not been conventionally done.

Under the above recognition, the present invention is aimed at the elimination of the above-mentioned problems, and at the provision of a process for producing a composite insulator constituted by a core member made of FRP or the like and a housing made of an insulating polymer material around the outer periphery of the core member, said process enabling adhesion between the core member and the housing to be excellently maintained and preventing an electric defect from occurring due to the formation of a gap between the core member and the housing.

For attaining the above object, the composite insulator-producing process according to the present invention includes the step of integrally forming the housing made of the insulating polymer material around the outer periphery of the rod-shaped core member made of such as FRP by using a mold in the state that the core member is mechanically or thermally expanded by substantially ($\delta-\alpha$) or more in which $\delta$ is an axially linear expanded length by which the core member would be thermally expanded if the core member is heated to a molding temperature for the housing, and $\alpha$ is an axially linear expanded length by which the mold would be thermally expanded if the mold is heated to a molding temperature.

In the specification and claims of this application, the above phrase "in the state that the core member is mechanically or thermally expanded by substantially ($\delta-\alpha$) or more in which $\delta$ is an axially linear expanded length by which the core member would be thermally expanded if the core member is heated to a molding temperature for the housing, and $\alpha$ is an axially linear expanded length by which the mold would be thermally expanded if the mold is heated to a molding temperature", "$\delta$" and "$\alpha$" mean the following. That is, (1) $\delta = a_1 \times (t_1 - t_0) \times k_1$ in which $a_1$ is a length at the joining interface of the housing at a given temperature $t_0$, $t_1$ is the final molding temperature, and $k_1$ is a coefficient of linear thermal expansion.

(2) $\alpha = a_2 \times (t_1 - t_2) \times k_2$ in which $a_2$ is a length at the joining interface of the core member at a given temperature $t_1$ and $k_2$ is a coefficient of linear thermal expansion of the mold.

The mold is preheated to the temperature $t_2$ to as to shorten the molding time.

"Or more" in the phrase of "substantially (δ–α) or more" is intended to mean a case where the core member is slightly excessively expanded beyond the length of (δ–α), provided that adhesion between the core member and the housing is not adversely effected. Such a slightly excessive amount will be determined by materials constituting the FRP, adhesion strength between the core member and the housing, the breaking strength of the core member, etc. The wording "in the state that the core member is mechanically or thermally axially expanded by substantially (δ–α) or more" means "the core member is axially expanded at the above temperature $t_0$ by substantially (δ–α) or more.

The core member can be mechanically expanded by fixedly grasping the opposite end portions of the core member by appropriate grasping means and pulling these opposite end portions in axially opposite directions. Alternatively, the core member can be thermally expanded by placing the core member in a heating furnace after or before the adhesive or primer is applied to the outer periphery of the core member and heating the core member at a given temperature. On the other hand, if the composite insulator includes a rubbery housing made of such a material as enabling the housing to be directly bonded to the core member without using the primer or adhesive, the core member made of the FRP or the like is expanded by preliminarily heating it to near the molding temperature without being preliminarily mechanically expanded, and then set inside the mold. By merely doing so occurrence of an unsatisfactory adhesion interface can be prevented.

The mold to be used in the composite insulator-producing process according to the present invention may be any of those used in the injection molding, the transfer molding and the compression molding. The invention process may be favorably effected by using any of the injection molding, the transfer molding and the compression molding.

Since the insulating polymer material is molded and vulcanized around the outer periphery of the core member in the state that the core member is mechanically or thermally expanded by substantially (δ–α) or more and kept as it is, in which δ is the axially linear expanded length by which the core member would be thermally expanded if the core member is heated to a molding temperature for the housing, and α is an axially linearly expanded length by which the mold would be thermally expanded if the mold is heated to the molding temperature, the core member maintains this expanded state and is not expanded substantially any more even when the temperature is raised to the final vulcanizing temperature. Therefore, substantial stress is prevented from being axially applied to the interface between the polymer material and the core member bonded together via the primer or adhesive during the time when the polymer material is molded and vulcanized in the mold. As a result, adhesion between the core member and the housing of the resulting composite insulator can be excellently maintained, so that no gap is formed between the core member and the housing. Thereby, occurrence of the electric defect can be prevented.

The following (1) through (5) may be recited as preferred embodiments of the composite insulator according to the present invention. In addition to the following features, any combination of the following features may be included as preferred in the present invention so long as no contradiction occurs.

(1) Before the bonding reaction between the core member and the housing material is completed, the core member is mechanically or thermally expanded by substantially (δ–α) or more in which δ is the axially linear expanded length by which the core member would be thermally expanded if the core member is heated to a molding temperature for the housing, and α is an axially linearly expanded length by which the mold would be thermally expanded if the mold is heated to the molding temperature. By so doing, adhesion between the core member and the housing can be more excellently maintained so that the formation of any gap between them and the occurrence of any incident electric defect may be more effectively prevented.

(2) Within a $T_{10}$ time period of a rheometer measurement of the housing-constituting polymer material, the core member is mechanically or thermally expanded by substantially (δ–α) or more in which δ is the axially linear expanded length by which the core member would be thermally expanded if the core member is heated to a molding temperature for the housing, and α is an axially linearly expanded length by which the mold would be thermally expanded if the mold is heated to the molding temperature. The above $T_{10}$ time period is measured by a rheometer such as "CURELASTOMER®" manufactured by Japan Synthetic Rubber Co., Ltd.

Within the $T_{10}$ time period of a rheometer measurement of the housing-constituting polymer material, the housing-constituting polymer material still has a sufficient fluidity and the bonding reaction does not largely proceed, the elongation of the core member during this time period does not influence any adverse influence upon the adhesion between the core member and the housing. Therefore, the adhesion between the core member and the housing can be excellently maintained. As a result, since the core member can be excellently bonded to the housing made of the insulating polymer material, the resulting composite insulator has the probability of any electric defect largely reduced.

(3) The core member is mechanically expanded by axially exerting forces upon the core member from the exterior of the mold for molding the composite insulator by substantially (δ–α) or more in which δ is the axially linear expanded length by which the core member would be thermally expanded if the core member is heated to a molding temperature for the housing, and α is an axially linearly expanded length by which the mold would be thermally expanded if the mold is heated to the molding temperature. In this case, the existing mold can be utilized for effecting the invention process without largely changing the design.

(4) Pulling members are fitted to opposite end portions of the core member and so designed that when the core member is placed in the mold and the mold is closed, the pulling members are positioned inside the mold such that between an axially outer end face of each of the pulling members and an opposed face of the mold is provided a clearance for allowing the core member to be axially linearly expanded, when the core member is heated up to the final housing-molding temperature, by substantially (δ–α) or more in which δ is the axially linear expanded length by which the core member would be thermally expanded if the core member is heated to a molding temperature for the housing, and α is an axially linearly expanded length by which the mold would be thermally expanded if the mold is heated to the molding temperature. By so doing, as the core member is heated up to the final housing-molding temperature, the housing-molding material mechanically axially outwardly presses the pulling members and consequently axially linearly expands the core member by substantially (δ–α) or more. In this case, the axially flowing force of the insulating polymer material can be utilized and the mold itself can be effectively utilized.

(5) In the above (4), the axial length of the clearance can be adjustable. By so doing, the clearance can be selectively made optimum depending upon the kind of the molding material, etc., so that the adhesion between the core member and the housing made of the insulating polymer material can be optimized.

These and other objects, features and advantages of the invention upon reading of the invention when taken in conjunction of the attached drawings, with the understanding that various changes, modifications and variations could be made by the skilled in the art.

BRIEF DESCRIPTION OF THE DRAWINGS

For a better understanding of the invention, reference is made to the attached drawings, wherein.

DETAILED DESCRIPTION OF THE INVENTION

In the following, the present invention will be explained in more detail with reference to the attached drawings. Although the process of the present invention will be explained in the following embodiments with respect to the injection molding, the skilled person in the art will understand that those embodiments will be applied to the transfer molding process and the compression molding process with necessary modifications thereupon.

Figure 1:
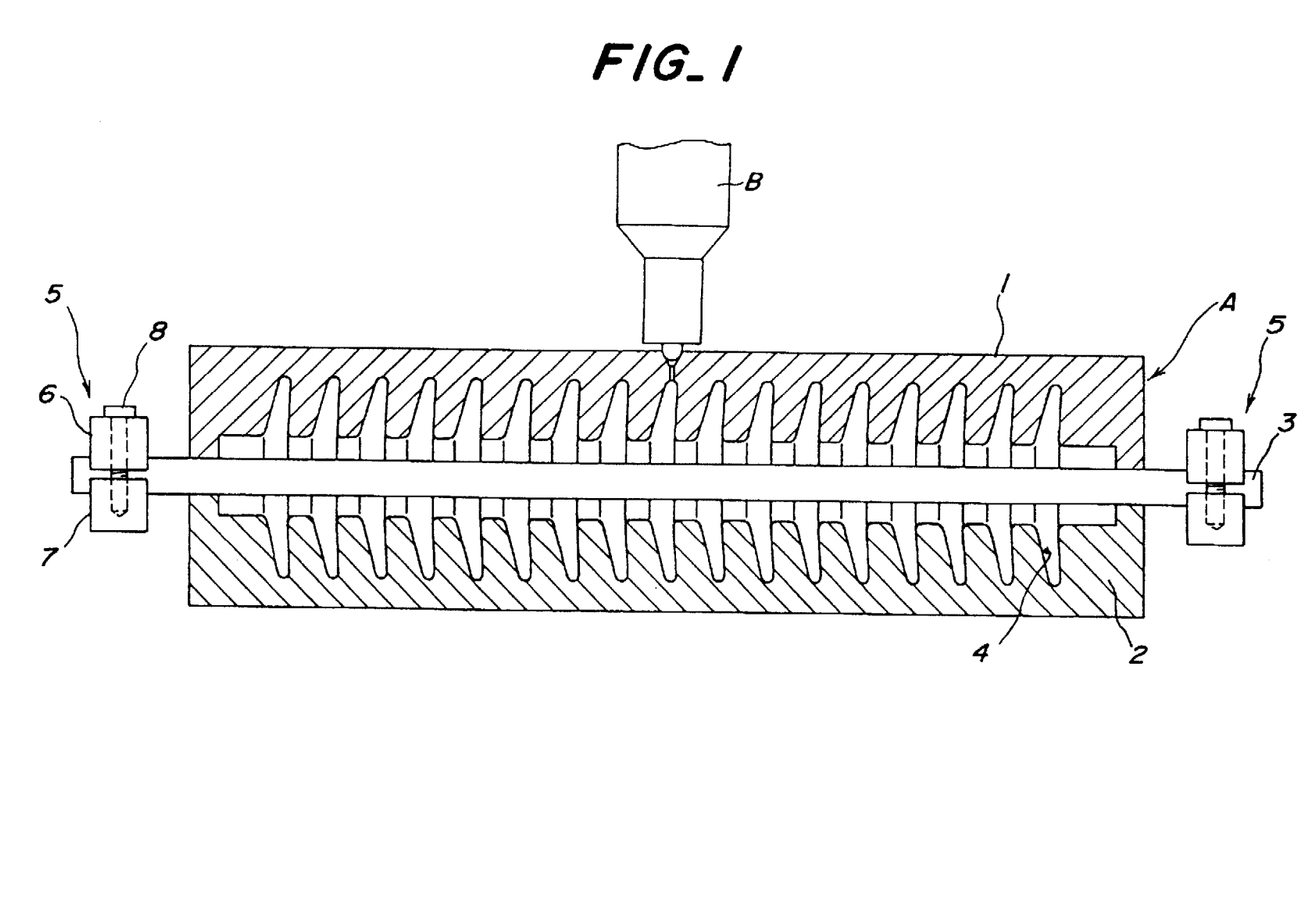
FIG. 1 is a partially sectional view of a first embodiment of a mold device for practicing the composite insulator-producing process according to the present invention by injection molding.
Figure 2:
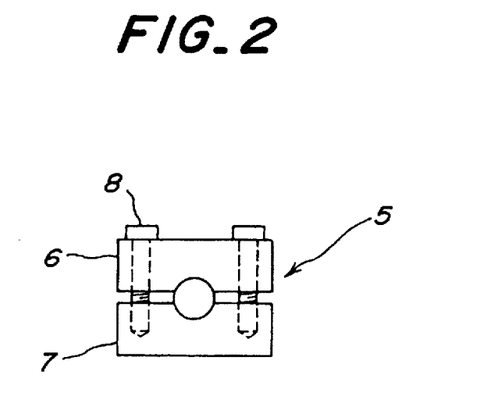
FIG. 2 is a front view of a pulling member to be used in the first embodiment.

FIGS. 1 and 2 show a first molding device to be used for effecting the composite insulator-producing process according to the present invention. FIG.1 is a sectional view of a mold A closed. The mold A is constituted by an upper mold unit 1 and a lower mold unit 2, and each mold unit is provided with a recess 4 for the formation of a housing to be arranged around the outer periphery of a core member 3 of the composite insulator and constituted by shed portions and a sheath portion. Opposite end portions of the core member 3 are projected outside from the mold A, and a pulling jig 5 is fitted to each of the opposite end portions. As shown in FIGS. 1 and 2, the pulling jig 5 includes a pair of upper and lower fitting members 6 and 7 and tightening bolts 8 for fixing the core member between the fitting members 6 and 7 by tightening the fitting members 6 and 7 with the bolts 8. Each of the fitting members has a recess with a semi-circular sectional shape meeting the outer periphery of the core member. The pulling jig 5 is pulled in a lateral direction by appropriate pulling means not shown. Although not shown, one of the right and left pulling jig may be contacted with an end of the mold A. In this case, the core member can be axially expanded by a given length through pulling the other pulling jig only. By using this mold device, the composite insulator according to the present invention is produced by the steps of (1) applying a primer or an adhesive to the outer periphery of the rod-shaped core member made of FRP or the like, (2) placing the core member inside the mold A, (3) after or before the mold A is closed, preliminarily mechanically linearly expanding the core member substantially ($\delta-\alpha$) or more in which $\delta$ is the axially linear expanded by a length by which the core member would be thermally expanded if the core member is heated to a molding temperature for the housing, and $\alpha$ is an axially linearly expanded length by which the mold would be thermally expanded if the mold is heated to the molding temperature, (4) forming a housing from a housing-forming material made of an insulating polymer material around the outer periphery of the core member by injecting in the state that the mold A is closed, and (5) vulcanized the insulating polymer material. In FIG. 1, a reference numeral B denotes a injecting device for injecting the housing-forming insulating polymer material into the recess 4 of the mold around the core member 3.

Figure 3:
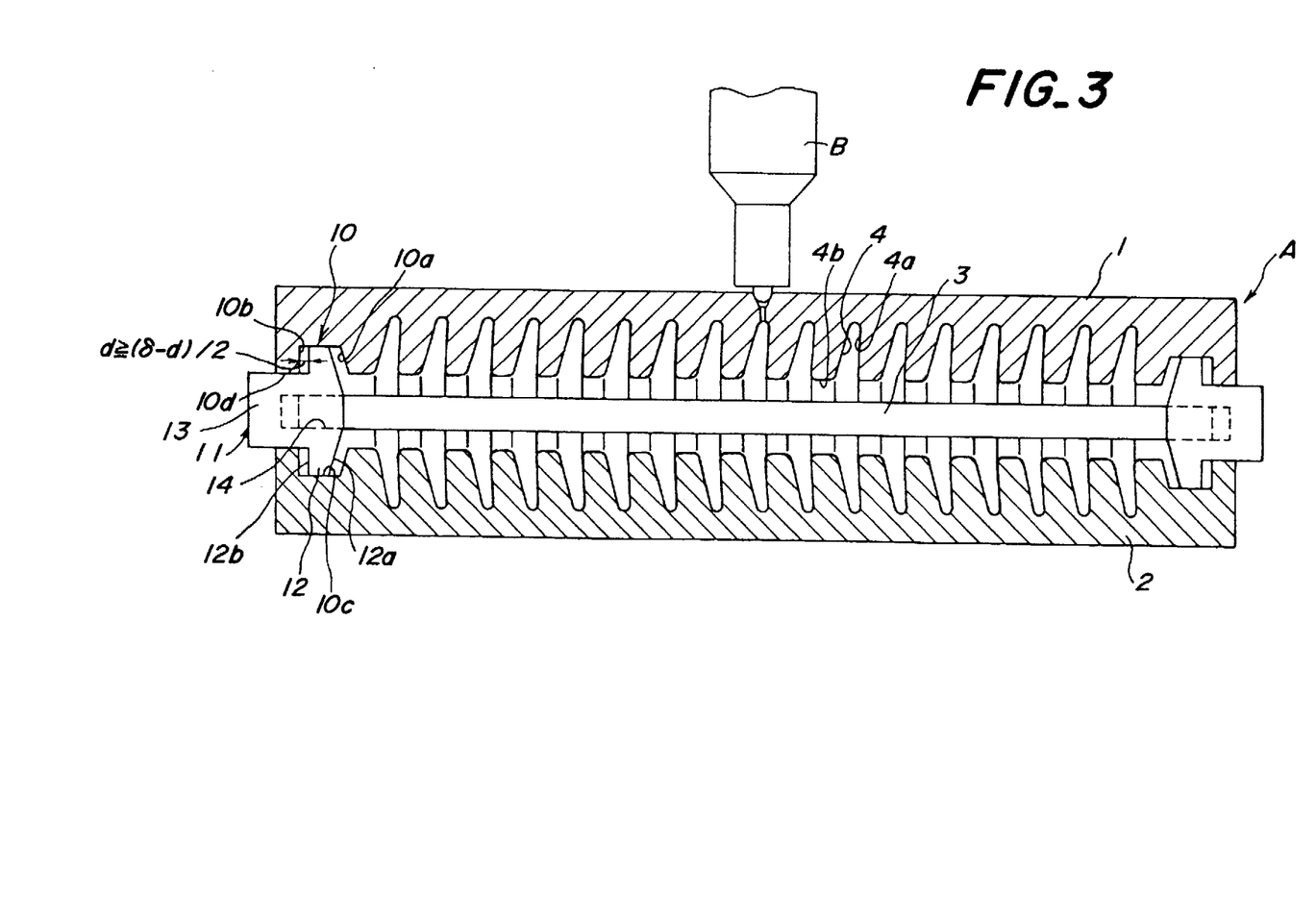
FIG. 3 is a partially sectional view of a second embodiment of a mold device for practicing the composite insulator-producing process according to the present invention by injection molding.

FIG. 3 shows a second mold device to be used for effecting the composite insulator-producing process according to the present invention. In FIG. 3, constituent parts being the same as or similar to those in FIG. 1 are denoted by the same reference numerals. What are differences between the mold devices in FIG. 1 and FIG. 3 is that in the embodiment of FIGS. 1 and 2, the pulling means are provided at those end portions of the core member which are located outside the mold, whereas in the second embodiment of FIG. 3, such pulling members are fitted to opposite ends of the core member inside the mold. In the following, this second embodiment will be explained in detail.

A recess 10 is provided in each of opposite ends of each of upper and lower molds 1 and 2. This recess 10 continues to a sheath portion-forming recess 4b of the housing-forming recess 4, and has an inner diameter greater than that of the sheath portion-forming recess 4b. The recess 10 is defined by a semi-annular frusto-conical face 10a located in an axially inner side and inclined in an axially inwardly central direction, a vertically flat face 10b on an axially outer side, a semi-cylindrical face 10c connecting the semi-annular frusto-conical face 10a with the vertically flat face 10b, and a semi-cylindrical face 10d continuing a radially inner end of the vertically flat face 10b, extending axially outwardly and opened at an end face of the mold. Into the recess 10 is fitted a pulling member 11 attached to an end portion of the core member 3. The pulling member 11 includes a large-diameter portion 12 having the outer diameter substantially equal to the inner diameter of the semi-cylindrical face 10c, and a small-diameter portion 13 having the outer diameter substantially equal to the inner diameter of the semi-cylindrical face 10d. At a central portion of an inner end face of the pulling member is provided a recess 14, and an end portion of the core member is closely fitted into and fixed, by appropriate screw means, to this recess 14. An axially inner end face 12a of the large-diameter portion 12 is frusto-conical to meet the cylindrical face 10a and 10a of the upper and lower mold units, and is designed such that when the core member 3 attached with the pulling members 11 is placed in the mold and the mold is closed, the axially inner end face 12a is spaced from the respectively opposed cylindrical faces 10a and 10a. The axially outer end face 12b of the large-diameter portion 12 is made vertically flat to meet the vertically flat face 10b, 10b. When the core member 3 attached with the pulling members 11 is placed in the mold and the mold is closed, each of the axially outer end faces 12b of the large-diameter portions 12 is spaced from the opposed vertically flat face 10b by a distance $d \geq (\delta-\alpha)/2$ in which $\delta$ and $\alpha$ have the same meanings as given above.

By using this second mold device, a composite insulator is produced according to the present invention by the steps of (1) applying the primer or adhesive upon the outer periphery of the rod-shaped core member 3 made of FRP or the like, (2) fixing the end portions of the core member 3 into the respective recesses 14 of the pulling members 11, (3) placing the core member in the mold A, (4) closing the mold such that the pulling members 11 are located in the respective recesses 10, while each of the axially outer end faces 12$b$ is spaced from the opposed vertically flat face 10$b$ by a distance $d \geq (\delta-\alpha)/2$, (5) in this state, forming a housing around the outer periphery of the core member 3 through injecting the housing-forming material into the housing-forming recess 4 of the mold around the core member 3, (6) expanding the core member 3, and (7) vulcanizing the housing-forming material. In the above core member-expanding step (6), the housing-forming material injected into the recess 4 of the mold A axially linearly shifts the pulling members axially outwardly by a length $d \geq (\delta-\alpha)/2$ in each of axially opposite directions, that is, the injected housing-forming material axially linearly expands the core member by an entire length $2d \geq (\delta-\alpha)$ in which $\delta$ is the axially linear expanded by a length by which the core member would be thermally expanded if the core member is heated to a molding temperature for the housing, and $\alpha$ is an axially linearly expanded length by which the mold would be thermally expanded if the mold is heated to the molding temperature.

In this case, it is preferable to control the molding and vulcanizing conditions so that the core member is axially linearly mechanically expanded by substantially $(\delta-\alpha)$ or more within a time period when the housing-forming material exhibits $T_{10}$ of the rheometer measurement in which T is a torque of the housing-forming insulating polymer material. $T_{10}$ is 10% of the torque which the almost completely vulcanized insulating polymer material exhibits. In the second mold device, each of the pulling members 11 at the opposite ends of the core member is located inside the recess 10 of the mold such that each of the axially outer end faces 12$b$ of the pulling members 11 is equally spaced from the opposed vertically flat face 10$b$ by the distance of $d \geq (\delta-\alpha)/2$. Alternatively, each of the pulling members 11 at the opposite ends of the core member may be located inside the recess 10 of the mold such that the axially outer end faces 12$b$ of the pulling members 11 are spaced from the respectively opposed vertically flat faces 10$b$ by the total distance of $2d \geq (\delta-\alpha)$.

Further, it may be that while one of the pulling members is axially fixed relative to the mold, only the other is made axially displaceable relative to the mold by $(\delta-\alpha)$ or more.

The face 10$b$ and the face 12$b$, which defines the clearance between them for allowing the core member to be axially displaced by $(\delta-\alpha)$ or more, are not limited to the vertically flat shape, but they may be of any shape so long as they define a clearance to axially displace the core member as mentioned above.

In the case of the transfer molding process, the composite insulator-producing process according to the present invention can be easily effected by using a transfer mold device in which pulling members are located inside or outside a mold as in the case of the above-explained mold devices. The composite insulator-producing process according to the present invention can be easily effected in the case of the compression molding in the same manner as in the cases of the injection molding process and the transfer molding process except that before or after the pulling members are fitted to the opposite end portions of the core member, a cylindrical housing-forming preform is formed around the core member, the resulting assembly composed of the core member and the housing-forming preform formed around the core member is placed between upper and lower molds, and a housing is formed around the core member by closing the upper and lower molds.

Although the mold devices in FIGS. 1 through 3 have been explained with respect to the integrated upper and lower mold units, as a matter of course, the composite insulator-producing process according to the present invention can be applied to a mold constituted by segment type upper and lower mold units. That is, each of the upper and lower mold units is constituted by piling a necessary number of mold segments each having a sheath portion-forming recess and one or more shed portion-forming recesses one upon another and axially fixedly tightening these mold segments by means of bolts or the like.

Figure 4:
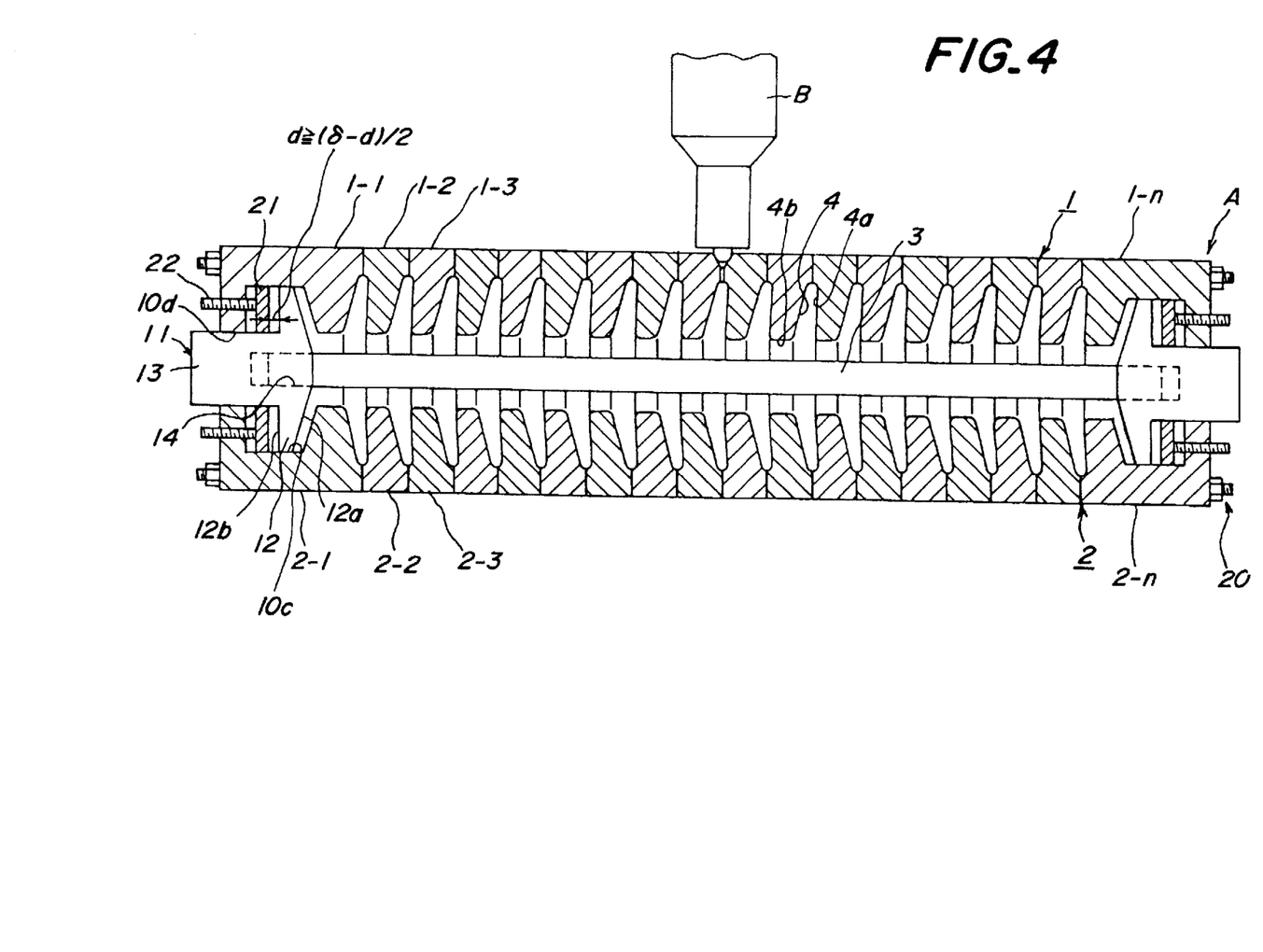
FIG. 4 is a partially sectional view of a third embodiment of a mold device for practicing the composite insulator-producing process according to the present invention by injection molding.

In the above-mentioned embodiments, it may be that a clearance, which is formed between the axially outer end face of the pulling member and the opposed face of the mold when the core member attached with the pulling members is placed inside the mold and the mold is closed, may be adjusted so that the core member may be appropriately mechanically expanded, through the pulling members being axially outwardly pressed with the housing-forming material, by $(\delta-\alpha)$ or more in which $\delta$ is the axially linear expanded by a length by which the core member would be thermally expanded if the core member is heated to a molding temperature for the housing, and $\alpha$ is an axially linearly expanded length by which the mold would be thermally expanded if the mold is heated to the molding temperature. As the clearance-adjusting means, for example, the face of the mold opposed to the axially outer end face of the pulling member may be made movable. Alternatively, the clearance may be adjusted by a separately provided axial location-adjusting means such as bolts. FIG. 4 shows an embodiment of a segment type mold device provided with such axial location-adjusting means. In this embodiment, an upper mold unit is constituted by a necessary number of mold segments 1—1, 1–2, 1–3, . . . , 1–n, and a lower mold unit is constituted by a necessary number of mold segments 2–1, 2—2, 2–3, . . . , 2–n. The mold segments of each mold unit are integrally tightened by tightening bolts and nuts denoted by 20. A reference numeral 21 denotes a planar member which is axially displaceable in an axial direction inside the recess by means of a blot screwed to the mold segment 1—1, 2–1, 1–n, 2–n at the end portion of the mold and fixed to the axially outer surface of the planar member. Since the other construction of the embodiment in FIG. 4 is almost the same as that in FIG. 3, explanation of the embodiment of FIG. 4 is omitted.

In the following working examples of the composite insulator-producing process according to the present invention will be described.

(WORKING EXAMPLE 1)

A mold device having the substantially same structure as that of the mold device in FIG. 1 was used. A final housing-molding temperature was set at 170° C., and a composite insulator was produced from silicone rubber by forming a housing from silicone rubber around the outer periphery of a rod-shaped core member made of FRP. As a primer, PRIMER C manufactured by Tore Dow Corning Co., Ltd. was used. With respect to each of thus produced composite insulators, a $\delta$ value and a $\alpha$ value are shown in table 1 together with a $(\delta-\alpha)$ value. Whether a gap was formed between end portions of the housing and the rod-shaped core member or not was confirmed with respect to all the composite insulators thus produced. Results are shown in Table 2. In Table 2, ○ shows that no gap was formed in the composite insulator, and X shows that a gap was formed in the composite insulator.

TABLE 1

| δ-value & α-value | Length of core member | | | |
|---|---|---|---|---|
| | 3 m | 4 m | 5 m | 6 m |
| δ-value | 1.68 | 2.24 | 2.80 | 3.36 |
| α-value | 0.72 | 0.96 | 1.20 | 1.44 |
| δ–α | 0.96 | 1.28 | 1.60 | 1.92 |

FRP coefficient of thermal expansion of rod: $7 \times 10^{-6}/°C$.
Temperature range: 90–170° C.
Coefficient of thermal expansion of mold: $12 \times 10^{-6}/°C$.
Temperature range: 150–170° C.

TABLE 2

| Mechanically expanded amount | Length of core member | | | |
|---|---|---|---|---|
| | 3 m | 4 m | 5 m | 6 m |
| 0.0 mm | X | X | X | X |
| 1.0 mm | ○ | X | X | X |
| 1.3 mm | ○ | ○ | X | X |
| 1.6 mm | ○ | ○ | ○ | X |
| 2.0 mm | ○ | ○ | ○ | ○ |

○: no gap formed
X: gap formed

From the above working example, it is seen that when the housing was integrally formed from the housing-forming insulating polymer material around the outer periphery of the core member in the state that the core member was axially mechanically expanded within the range specified in the present invention, no gap was formed between either end portion of the housing and the core member.

(WORKING EXAMPLE 2)

A working example of the composite insulator-producing process according to the present invention in which a core member was preliminarily axially expanded by preheating the core member will be described below.

A mold device having the substantially same mold structure as that of the embodiment of FIG. 1 was used, except that the pulling members 5 were removed. A final housing-molding temperature was set at 140° C. A rod-shaped core member made of FRP was set inside a mold after being preheated at a given temperature, and a composite insulator was produced by forming a housing from an addition type silicone rubber which is curable at room temperature (RTV silicone rubber) manufactured by Shin-etsu Silicone Co., Ltd. under a tradename of KE1800 (A·B·V) around the outer periphery of the rod-shaped core member.

Whether a gap was formed between end portions of the housing and the rod-shaped core member or not was confirmed with respect to all the composite insulators thus produced. Results are shown in Table 3. In Table 2, ○ shows that no gap was formed in the composite insulator, and X shows that a gap was formed in the composite insulator.

TABLE 3

| Preheating temperature | Length of core member | | | |
|---|---|---|---|---|
| | 3 m | 4 m | 5 m | 6 m |
| 120 | X | X | X | X |
| 125 | ○ | X | X | X |
| 130 | ○ | ○ | X | X |
| 135 | ○ | ○ | ○ | X |
| 140 | ○ | ○ | ○ | ○ |

○: no gap formed
X: gap formed
FRP coefficient of thermal expansion of rod: $7 \times 10^{-6}/°C$.
Coefficient of thermal expansion of mold: $12 \times 10^{-6}/°C$.

As having mentioned above, according to the composite insulator-producing process of the present invention, the housing is formed from the housing-forming insulating polymer material and then vulcanized around the outer periphery of the rod-shaped core member by using the mold in the state that the core member is mechanically or thermally expanded by substantially (δ–α) or more in which δ is an axially linear expanded length by which the core member would be thermally expanded if the core member is heated to a molding temperature for the housing, and α is an axially linear expanded length by which the mold would be thermally expanded if the mold is heated to a molding temperature, excess compression stress or tensile stress will not be applied to the interface between core member and the housing fixedly bonded together by the primer or adhesive during the time period when the housing is integrally formed and vulcanized round the outer periphery of the core member. Accordingly, no gap is formed at the interface between the core member and the housing, so that the composite insulator having good insulation property can be obtained.

Further, even if the composite insulator is produced by any one of the injection molding, the transfer molding and the compression molding, the composite insulator-producing process according to the present invention can be practiced by using the simple mold device.

In the case where before the bonding reaction between the core member and the housing material is completed, the core member is mechanically expanded by substantially above (δ–α) or more, the bonding between the core member and the housing can be made more firm.

In the case where within the $T_{10}$ time period of a rheometer measurement of the housing-constituting polymer material, the core member is mechanically expanded by substantially (δ–α) or more as mentioned above, the composite insulator having more excellent insulating property can be obtained.

In the case where the core member is mechanically expanded by axially exerting forces upon the core member from the exterior of the mold for molding the composite insulator by substantially (δ–α) or more as mentioned above, the composite insulator-producing process according to the present invention can be easily practiced by using an existing mold device with a substantially no change or modification together with the simple pulling members and pulling means.

In the case where the pulling members are fitted to opposite end portions of the core member and so designed that when the core member is placed in the mold and the mold is closed, the pulling members are positioned inside the mold such that between an axially outer end face of each of the pulling members and an opposed face of the mold is provided a clearance for allowing the core member to be axially linearly expanded, when the core member is heated up to the final housing-molding temperature, by substantially ($\delta-\alpha$) or more as mentioned above, and as the core member placed inside the mold is heated up to the final housing-molding temperature, the housing-molding material mechanically axially outwardly presses the pulling members and consequently axially linearly expands the core member by substantially ($\delta-\alpha$) or more, the axially outwardly flowing forces of the housing-forming insulating polymer material flowing inside the mold can be effectively utilized so that the composite insulator-producing process according to the present invention can be easily effected.

In the case where the axial length of the clearance can be adjustable. By so doing, the clearance can be selectively made optimum depending upon the kind of the molding material, etc., so that the adhesion between the core member and the housing made of the insulating polymer material can be optimized, a gap can be assuredly prevented from being formed at the interface between the housing and the core member even if the housing-forming insulating polymer material is changed.

What is claimed is:

1. A composite insulator-producing process comprising the steps of:
   providing a core member;
   providing a housing-forming mold;
   applying at least one of a primer and an adhesive to the outer periphery of the core;
   placing the core member inside the housing-forming mold;
   expanding the core member by substantially ($\delta-\alpha$) or more in which $\delta$ is an axially linear expanded length by which the core member would be thermally expanded if the core member is heated to a molding temperature for the housing, and $\alpha$ is an axially linear expanded length by which the mold would be thermally expanded if the mold is heated to a molding temperature;
   forming a housing by charging the mold with a housing-forming insulating polymer material; and vulcanizing the housing-forming insulating polymer material around the outer periphery of the core member.

2. The composite insulator-producing process set forth in claim 1, wherein the composite insulator is produced by a process selected from the group consisting of injection molding, transfer molding, and compression molding.

3. The composite insulator-producing process set forth in claim 1 wherein before a bonding of the core member to the housing forming insulating polymer material is completed, the core member is mechanically expanded by said substantially ($\delta-\alpha$) or more.

4. The composite insulator-producing process set forth in claim 1, wherein within a $T_{10}$ time period of a rheometer measurement of the housing-constituting polymer material, the core member is mechanically expanded by substantially ($\delta-\alpha$) or more.

5. The composite insulator-producing process set forth in claim 3, wherein within a $T_{10}$ time period of a rheometer measurement of the housing-constituting polymer material, the core member is mechanically expanded by substantially ($\delta-\alpha$) or more.

6. The composite insulator-producing process set forth in claim 1, wherein the core member is mechanically expanded by axially exerting forces upon the core member from an exterior of the mold for molding the composite insulator by said substantially ($\delta-\alpha$) or more.

7. The composite insulator-producing process set forth in claim 3, wherein the core member is mechanically expanded by axially exerting forces upon the core member from an exterior of the mold for molding the composite insulator by said substantially ($\delta-\alpha$) or more.

8. The composite insulator-producing process set forth in claim 4, wherein the core member is mechanically expanded by axially exerting forces upon the core member from an exterior of the mold for molding the composite insulator by said substantially ($\delta-\alpha$) or more.

9. The composite insulator-producing process set forth in claim 5, wherein the core member is mechanically expanded by axially exerting forces upon the core member from an exterior of the mold for molding the composite insulator by said substantially ($\delta-\alpha$) or more.

10. The composite insulator-producing process set forth in claim 1, wherein pulling members are fitted to opposite end portions of the core member and are so designed that when the core member is placed in the mold and the mold is closed, the pulling members are positioned inside the mold such that between an axially outer end face of each of the pulling members and an opposed face of the mold is provided a clearance for allowing the core member to be axially linearly expanded, when the core member is heated up to the final housing-molding temperature, by said substantially ($\delta-\alpha$) or more, and as the core member placed inside the mold is heated up to a final housing-molding temperature, the housing-molding material mechanically axially outwardly presses the pulling members and consequently axially linearly expands the core member by substantially ($\delta-\alpha$) or more.

11. The composite insulator-producing process set forth in claim 3, wherein pulling members are fitted to opposite end portions of the core member and are so designed that when the core member is placed in the mold and the mold is closed, the pulling members are positioned inside the mold such that between an axially outer end face of each of the pulling members and an opposed face of the mold is provided a clearance for allowing the core member to be axially linearly expanded, when the core member is heated up to the final housing-molding temperature, by said substantially ($\delta-\alpha$) or more, and as the core member placed inside the mold is heated up to a final housing-molding temperature, the housing-molding material mechanically axially outwardly presses the pulling members and consequently axially linearly expands the core member by substantially ($\delta-\alpha$) or more.

12. The composite insulator-producing process set forth in claim 4, wherein pulling members are fitted to opposite end portions of the core member and are so designed that when the core member is placed in the mold and the mold is closed, the pulling members are positioned inside the mold such that between an axially outer end face of each of the pulling members and an opposed face of the mold is provided a clearance for allowing the core member to be axially linearly expanded, when the core member is heated up to a final housing-molding temperature, by said substantially ($\delta-\alpha$) or more, and as the core member placed inside the mold is heated up to the final housing-molding temperature, the housing-molding material mechanically axially outwardly presses the pulling members and consequently axially linearly expands the core member by substantially ($\delta-\alpha$) or more.

13. The composite insulator-producing process set forth in claim 5, wherein pulling members are fitted to opposite end portions of the core member and are so designed that when the core member is placed in the mold and the mold is closed, the pulling members are positioned inside the mold such that between an axially outer end face of each of the pulling members and an opposed face of the mold is provided a clearance for allowing the core member to be axially linearly expanded, when the core member is heated up to a final housing-molding temperature, by said substantially ($\delta-\alpha$) or more, and as the core member placed inside the mold is heated up to the final housing-molding temperature, the housing-molding material mechanically axially outwardly presses the pulling members and consequently axially linearly expands the core member by substantially ($\delta-\alpha$) or more.

14. The composite insulator-producing process set forth in claim 10, wherein an axial length of the clearance is adjustable.

15. The composite insulator-producing process set forth in claim 11, wherein an axial length of the clearance is adjustable.

16. The composite insulator-producing process set forth in claim 12, wherein an axial length of the clearance is adjustable.

17. The composite insulator-producing process set forth in claim 13, wherein an axial length of the clearance is adjustable.

* * * * *